(12) United States Patent
Johnston

(10) Patent No.: US 9,373,186 B2
(45) Date of Patent: Jun. 21, 2016

(54) DEVICE AND METHOD UTILIZING ANIMATED FRAMES TO DYNAMICALLY CREATE SNAPSHOTS FOR SELECTABLE MENUS

(75) Inventor: Rory Johnston, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 328 days.

(21) Appl. No.: 13/067,614

(22) Filed: Jun. 14, 2011

(65) Prior Publication Data
US 2012/0005627 A1    Jan. 5, 2012

Related U.S. Application Data

(60) Provisional application No. 61/354,406, filed on Jun. 14, 2010.

(51) Int. Cl.
| | |
|---|---|
| G06F 3/048 | (2013.01) |
| G06T 13/80 | (2011.01) |
| A63F 13/40 | (2014.01) |
| G06F 3/0482 | (2013.01) |

(52) U.S. Cl.
CPC .............. G06T 13/80 (2013.01); A63F 13/10 (2013.01); G06F 3/0482 (2013.01); *A63F 2300/6018* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 7,050,102 B1* | 5/2006 | Vincent | ............... | G01C 11/02 348/141 |
| 7,823,066 B1* | 10/2010 | Kuramura | ............ | G06Q 30/00 715/717 |
| 2004/0087363 A1* | 5/2004 | Bogenn | ................ | A63F 13/10 463/29 |
| 2008/0320546 A1* | 12/2008 | Moon | ............. | H04N 7/17318 725/136 |
| 2009/0113303 A1* | 4/2009 | Goossen | .............. | A63F 13/10 715/719 |
| 2009/0259937 A1* | 10/2009 | Rohall | ................ | G06Q 10/10 715/706 |
| 2010/0151948 A1* | 6/2010 | Vance | ................. | A63F 13/06 463/43 |
| 2010/0164910 A1* | 7/2010 | Tomisawa | ........ | G02B 27/0093 345/204 |
| 2010/0227689 A1* | 9/2010 | Brunet de Courssou | ............ | G07F 17/32 463/37 |
| 2010/0259645 A1* | 10/2010 | Kaplan | ............. | G11B 27/034 348/231.99 |
| 2010/0262911 A1* | 10/2010 | Kaplan | ............. | G11B 27/034 715/719 |
| 2010/0298043 A1* | 11/2010 | Bytnar | ................ | G07F 17/32 463/24 |
| 2011/0018884 A1* | 1/2011 | Ritts | .................... | G06F 11/32 345/522 |
| 2011/0050687 A1* | 3/2011 | Alyshev | ............. | G06F 9/4443 345/419 |
| 2012/0057218 A1* | 3/2012 | Setagawa | ............ | G02F 1/167 359/296 |
| 2012/0212344 A1* | 8/2012 | Forsberg | ............. | G08B 3/10 340/573.1 |

* cited by examiner

*Primary Examiner* — Hua Lu
(74) *Attorney, Agent, or Firm* — Nixon & Vanderhye PC

(57) ABSTRACT

A user menu is created by retrieving at least one animation frame that corresponds to a user selected portion of stored subject matter. The animation frame or frames are displayed at a portion of the display and aid the user to accurately enter the subject matter at a desired location.

12 Claims, 17 Drawing Sheets

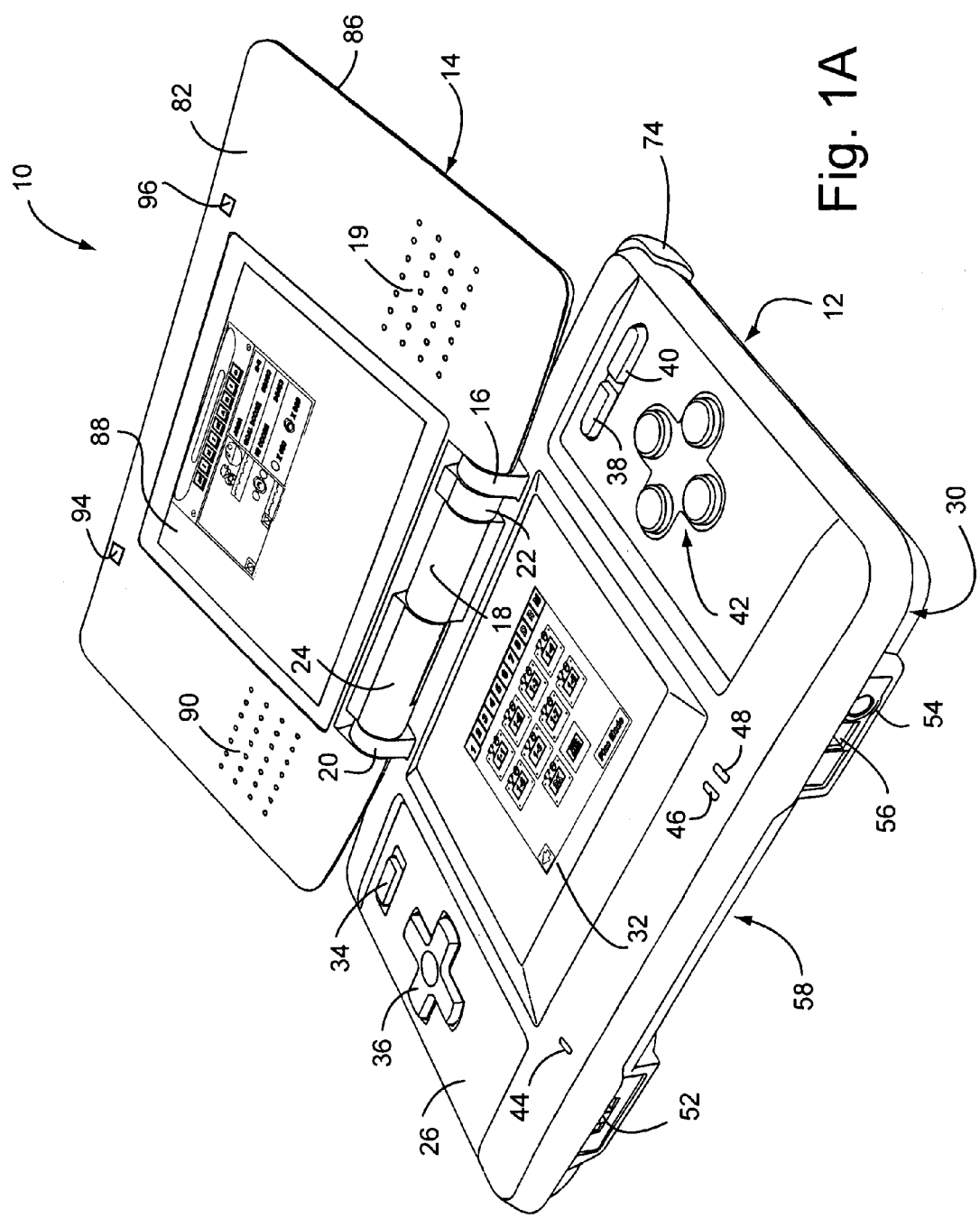

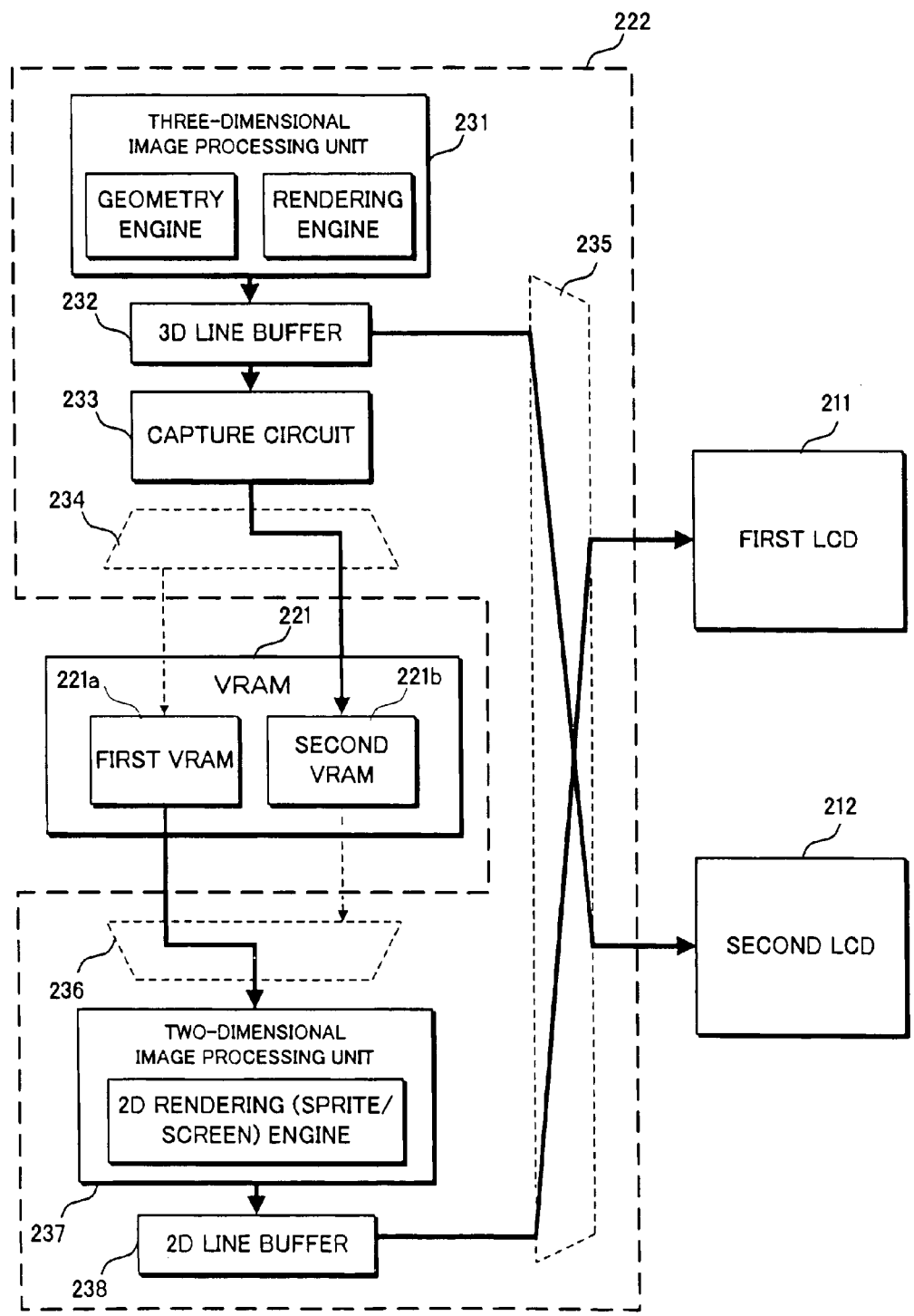

DEVICE AND METHOD UTILIZING ANIMATED FRAMES TO DYNAMICALLY CREATE SNAPSHOTS FOR SELECTABLE MENUS

CROSS REFERENCE TO RELATED APPLICATIONS

Benefit under 35 USC 119 is claimed from U.S. Provisional Application No. 61/354,406, filed Jun. 14, 2010, incorporated herein by reference in its entirety.

FIELD

The technology herein relates to graphical user interfaces, and to an electronic and communications device and, more specifically, to a new display which utilizes the application itself to dynamically construct user menus and illustrate corresponding levels or locations selectable by accessing the menu.

BACKGROUND AND SUMMARY

Commonly, movie DVDs come with menus allowing for selection of different scenes in the movie. For example, selecting a menu option showing scenes 1-4 can cause display of video portions of each of the scenes. The user can then select one of the video "thumbnails" to cause the movie to begin playing from that point.

It is also possible to create such menus to allow users to select different levels or options in video play. However, devices previously have required still art work to be created and loaded into the device for illustrating the various portions that are accessible to the user through the menu. Such art work takes valuable storage space and, during development and/or revisions, necessitates redrawing of the art work to accurately reflect the state of the developing application. Further improvements are possible.

In an exemplary embodiment, a portable, handheld or other electronic device is programmed so that the runtime application itself is used to automatically generate thumbnail icons or snapshots for inclusion in a selectable menu. Such dynamically created icons or snapshots can for example be used to illustrate corresponding levels or locations that are accessible to the user via menus. More particularly, for a specific level or option selected by the user via the menu, a frame is loaded and a display is generated showing the user the portion of the level selected with dynamically generated icons or thumbnails guiding the user's further selections.

In one example implementation, a snapshot image is automatically generated from the animation database. The system can appear to be simply displaying a static "canned" picture. Unfortunately, in many applications, the complexity of an application for use in a portable handheld device can place a premium on the amount of storage space available. Pre-storing individual pictures for many levels would waste space in the storage device that could be used for other useful functions.

Instead, during development, it is possible to specify a rectangle view into the 3D virtual world that will become a snapshot. A stored XY coordinate designating where to get an image from is relatively compact (e.g., two bytes for each level specifying the top left corner position of the rectangle in tile coordinates, to tell where the snapshot is going to be taken from). The snapshot may in some example implementations comprise a rectangle or other shape smaller than the screen size that can be placed anywhere within the virtual world. The rectangle or other shape specifies the area in the virtual world that the system will draw and display. Because all of the assets needed to display the level are already loaded, generating a display of the snapshot can be very fast. The system can use the stored XY coordinate to capture the image from within the application itself and render it including the background details.

In one example implementation, when the system switches to the next world, it draws a frame of the virtual environment, makes the characters in the environment look like they're moving, and that becomes the image to be displayed in the menu. In one example implementation, the image is only drawn once and then captured and stored e.g., in random access memory. A motion effect can be added so the snapshot appears to have been captured during dynamic operation of the virtual world as opposed to a still frame.

The particular image to be selected for a snapshot can be selected by a designer depending on what they want to show the user. For example, in a particular game level, it may be necessary for a player to get a character carrying a key to a door. The snapshot chosen could be to display an image of the character with the key and the door to give the user a cue that this is what is to be accomplished for that level. An advantage is that because the snapshot is generated at run time, it will represent the image that the application will actually present. Thus, if the artist changes the application, the snapshot will accurately represent it.

In operation of one exemplary embodiment, a portion of the display of the portable device, upon selection of a level by the user, first fades to black and an animation frame corresponding to the selected level is loaded and displayed in that portion of the display. By programming the device to utilize animation frames for automatically generating and displaying corresponding levels or locations that are selectable by accessing the menu, valuable storage space previously needed to store the still art work is freed up.

Moreover, since only a single or small number of animation frames is/are used for each menu level, instead of loading the entire, less RAM is used. Furthermore, the singularly displayed animation frame provides suitable feedback to the user for verifying that the selected level is the one desired by the user.

An example non-limiting handheld portable device and associated display will now be described in detail in connection with the drawings identified below.

BRIEF DESCRIPTION OF THE DRAWINGS

FIG. 1A is a perspective view of an end-user electronic and communications device with the device shown in an open, ready-to-use orientation;

FIG. 1E is an illustration showing the operation of the portable machine in an even-numbered frame;

DETAILED DESCRIPTION

Figure 1B:
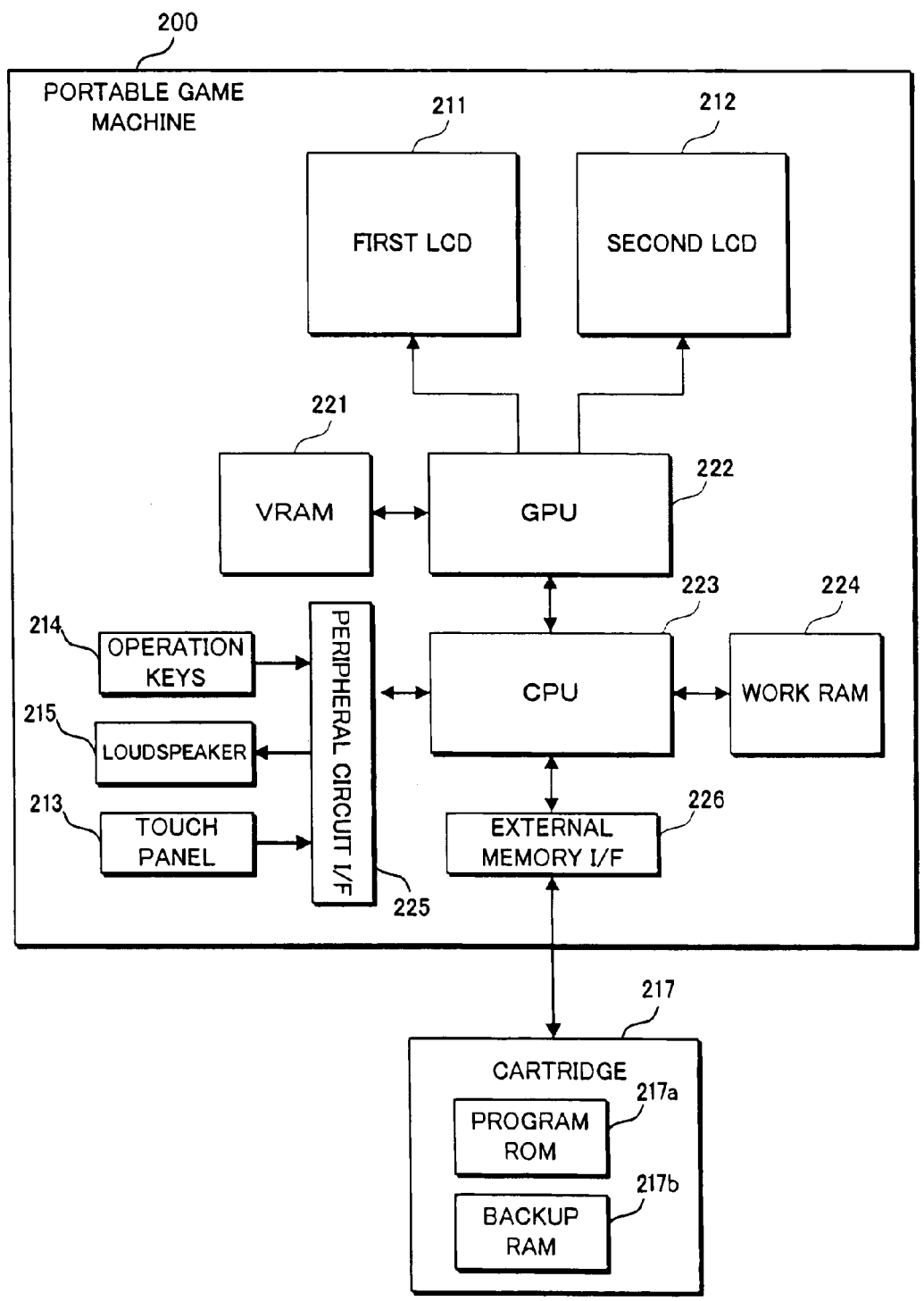
FIG. 1B is an illustration showing an internal configuration of an end-user portable machine.

Example Platform That Can be Used to Implement Example Implementation

FIG. 1A shows an illustrative embodiment of an end-user device or console 10 to include a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the device where the cover body 14 is in an open position and the is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane.

A first display screen 28 is recessed 32 is recessed within the upper face 26 of the main body 12 with dimensions of approximately 2½ inches in length and 1⅞ inches in width, yielding a diagonal screen dimension of 3 inches. The screen in the exemplary embodiment is a backlit, color liquid crystal display (LCD). This screen is touch sensitive and may be activated by a stylus, described further herein. A power button 34 is located in the upper left corner of face 26 and is used to turn the on and off. A cross-shaped directional control button 36 is located adjacent and below the power button 34, and is used for play control.

In the upper right corner of the main body 12, there are side-by-side "start" and "select" buttons 38, 40, respectively, with X/Y/A/B buttons 42 located adjacent and below the "start" and select" buttons. Buttons 38, 40 and 42 are also used for play control. A microphone 44 is located below the left edge of screen 32 for use with specially designed s having a microphone feature. A battery recharge indicator LED 46 and a power indicator LED 48 are also located on the upper face 26, adjacent the lower edge thereof, below the right edge of screen 32.

A lower or forward portion of the peripheral edge 30 (closest to the user) is provided with a volume control slide 52 and headphone and microphone connectors 54, 56 on either side of a first game slot 58. Slot 58 is especially designed for larger game cartridges or cards originally designed for use with the assignee's Game Boy Advance® game system.

The cover body 14 also has an upper (or inner) face 82 which incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body.

As already noted, the game card slot 58 is sized and adapted to receive a conventional game card designed for the by now well known Nintendo Gameboy Advance System®. Accordingly, the game card per se for slot 58 does not form any part of this invention and need not be described further.

FIG. 1B is a block diagram showing the portable machine 200. As shown in FIG. 1B, the portable machine 200 includes a CPU (central processing unit) 223, which is an example of a computer for executing the program, and other components. The CPU 223 includes a work RAM (working storage unit) 224, a GPU (graphic processing unit) 222, and a peripheral circuit I/F (interface) 225 that are electrically connected to one another. The work RAM 224 is a memory for temporarily storing, for example, the program to be executed by the CPU 223 and calculation results of the CPU 223. The GPU 222 uses, in response to an instruction from the CPU 223, a VRAM 221 to generate a image for display output to a first LCD (liquid crystal display unit) 211 and a second LCD 212, and causes the generated image to be displayed on the first display screen 211a of the first LCD 211 and the second display screen 212a of the second LCD 212. The peripheral circuit I/F 225 is a circuit for transmitting and receiving data between external input/output units, such as the touch panel 213, the operation keys 214, and the loudspeaker 215, and the CPU 223. The touch panel 213 (including a device driver for the touch panel) outputs coordinate data corresponding to a position input (specified) with the stylus 216.

Furthermore, the CPU 223 is electrically connected to the external memory I/F 226, in which the cartridge 217 is inserted. The cartridge 217 is a storage medium for storing the program and, specifically, includes a program ROM 217a for storing the program and a backup RAM 217b for rewritably storing backup data. The program stored in the program ROM 217a of the cartridge 217 is loaded to the work RAM 224 and is then executed by the CPU 223. In the present embodiment, an exemplary case is described in which the program is supplied from an external storage medium to the portable machine 200. However, the program may be stored in a non-volatile memory incorporated in advance in the portable machine 200, or may be supplied to the portable machine 200 via a wired or wireless communication circuit.

Figure 1C:
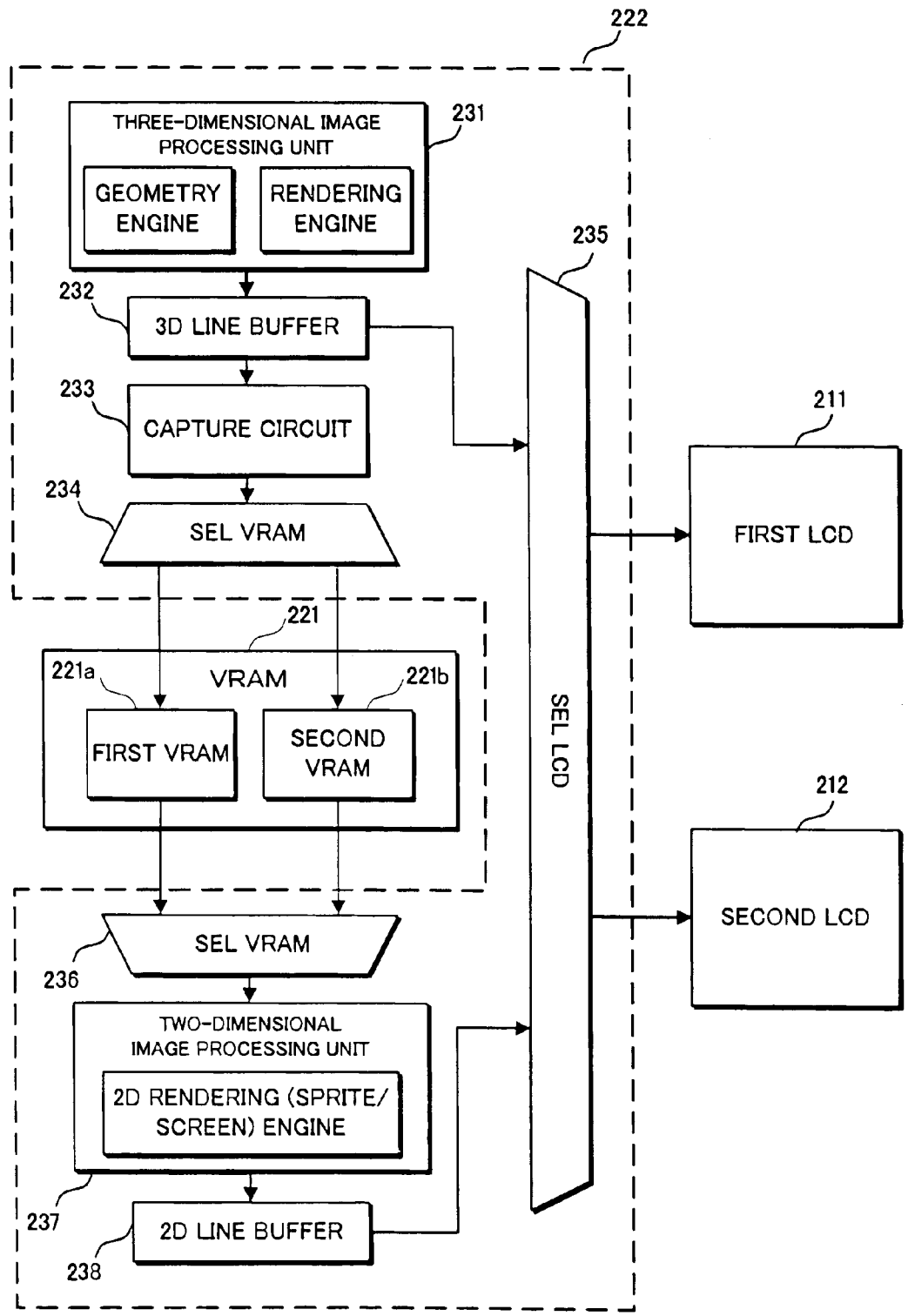
FIG. 1C is an illustration showing an internal configuration of an end-user GPU 222.

FIG. 1C is a block diagram of the GPU 222. The GPU 222 includes two image processing units, that is, a three-dimensional image processing unit 231 and a two-dimensional image processing unit 237. The three-dimensional image processing unit 231 includes a geometry engine for calculating each vertex of a three-dimensional model based on three-dimensional model data and a rendering engine for generating an image from the three-dimensional model disposed on a virtual three-dimensional space. The two-dimensional image processing unit 237 includes a 2D rendering engine for generating a image based on two-dimensional image data representing characters and two-dimensional image data representing backgrounds. More specifically, the two-dimensional image processing unit 237 disposes a two-dimensional image representing a character on a virtual screen called a "sprite" and a two-dimensional image representing a background on a virtual screen called a "screen" and then synthesizes these virtual screens to generate a image to be eventually displayed.

The three-dimensional image processing unit 231 is connected to the 3D line buffer 232. The 3D line buffer 232 is a buffer memory for temporarily retaining image data for one scanning line of the first LCD 211 (or the second LCD 212). The image data generated by the three-dimensional image processing unit 231 is stored in this 3D line buffer 232 sequentially by one line.

The 3D line buffer 232 is connected to a capture circuit 233 and an LCD selector (SEL LCD) 235. The capture circuit 233 sequentially reads image data for one line stored in the 3D line buffer 232 and then sequentially stores the read image data in the VRAM 221, which will be described further below, thereby capturing the image generated by the three-dimensional image processing unit 231.

The capture circuit 233 is connected to a VRAM selector (SEL VRAM) 234. The VRAM 221 is provided with two VRAMs, that is, a first VRAM 221a and a second VRAM 221b. Instead of these two first and second VRAMs 221a and 221b, a single VRAM may be used with its two different storage areas being used as the first VRAM 221a and the second VRAM 221b. The VRAM selector 234 switches an output destination of the capture circuit 233 between the first VRAM 221a and the second VRAM 221b.

The first VRAM 221a and the second VRAM 221b are connected to a VRAM selector (SEL VRAM) 236. The VRAM selector 236 switches a source of data to the two-dimensional image processing unit 237 between the first VRAM 21a and the second VRAM 221b.

The two-dimensional image processing unit 237 is connected to a 2D line buffer 238. As with the 3D line buffer 232, the 2D line buffer 238 is a buffer memory for temporarily retaining image data for one scanning line of the second LCD 212. The image data generated by the two-dimensional image processing unit 237 is stored in this 2D line buffer 238 sequentially by one line.

The 2D line buffer 238 is connected to an LCD selector 235. The LCD selector 235 switches an output destination of the 3D line buffer 232 between the first LCD 211 and the second LCD 212, and an output destination of the 2D line buffer 238 between the first LCD 211 and the second LCD 212. In the present embodiment, the LCD selector 235 performs control such that, when the output of the 3D line buffer 232 is supplied to the first LCD 11, the output of the 2D line buffer 38 is supplied to the second LCD 212, and when the output of the 3D line buffer 232 is supplied to the second LCD 212, the output of the 2D line buffer 238 is supplied to the first LCD 211.

The portable machine 200 has the above-described structure. Generally, the image generated by the three-dimensional image processing unit 231 is supplied via the 3D line buffer 232 and the LCD selector 235 to the first LCD 211, while the image generated by the two-dimensional image processing unit 237 is supplied via the 2D line buffer 238 and the LCD selector 235 to the second LCD 212. As a result, the three-dimensional image generated by the three-dimensional image processing unit 231 is displayed on the first display screen 211a, while the two-dimensional image generated by the two-dimensional image processing unit 237 is displayed on the second display screen 212a. However, the present embodiment has a feature in which the above-structured portable machine 200 is used to display different three-dimensional images on two display screens, that is, the first display screen 211a and the second display screen 212a. Hereinafter, the operation of the portable machine 200 according to the present embodiment is described.

The portable machine 200 alternately performs operations with periods of one frame. Hereinafter, the operation of the portable machine 200 is described as being divided into a process in an odd-numbered frame and a process in an even-numbered frame. Note that the "odd-numbered frame" and the "even-numbered frame" are merely so called for convenience. In other words, if one frame is assumed to be an odd-numbered frame, frames before and after that frames are even-numbered frames. Conversely, if one frame is assumed to be an even-numbered frame, frames before and after that frames are odd-numbered frames.

Figure 1D:
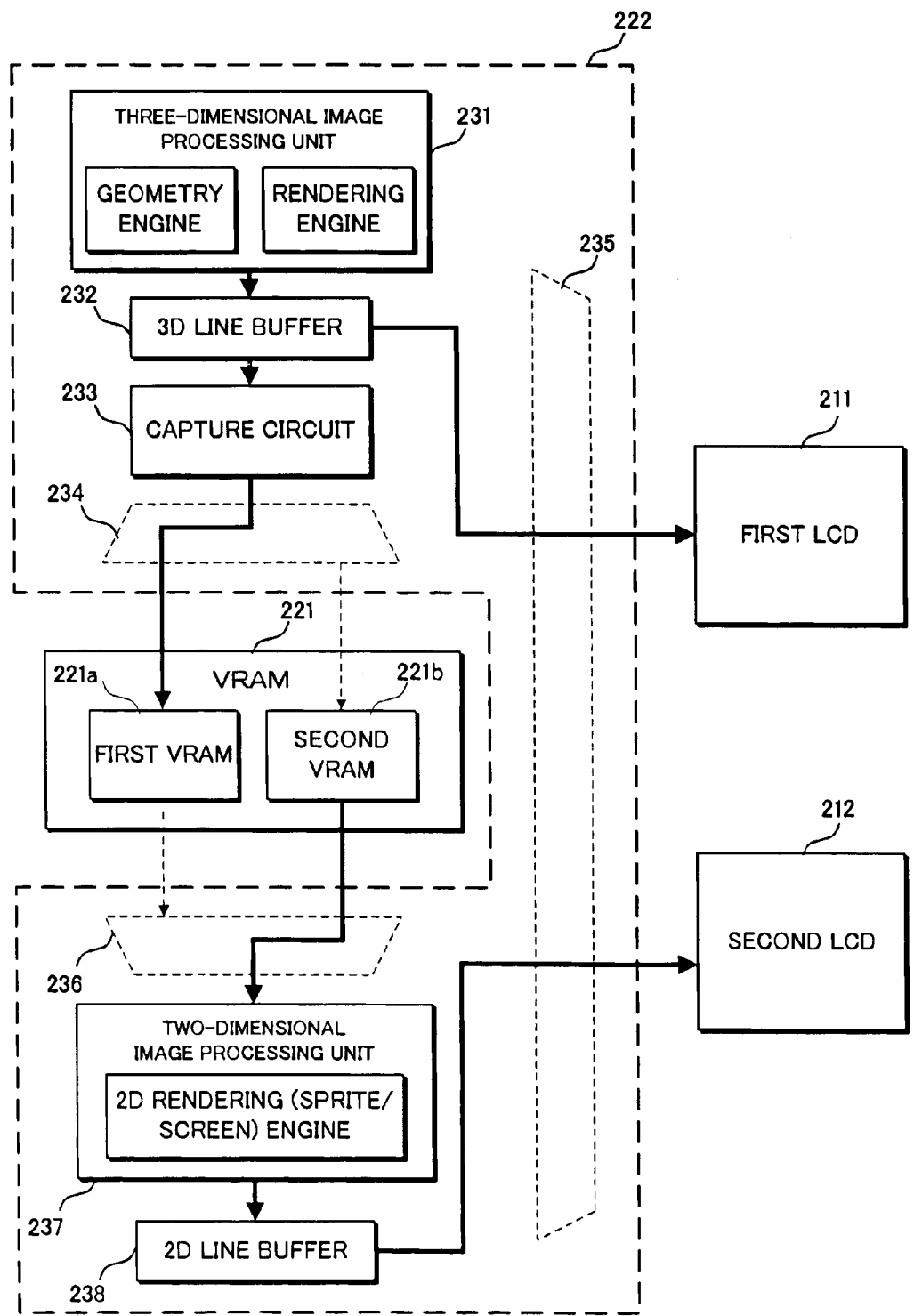
FIG. 1D is an illustration showing the operation of a portable machine in an odd-numbered frame.

FIG. 1D is an illustration showing the operation of the portable machine 200 in an odd-numbered frame. As shown in FIG. 1D, in the odd-numbered frame, the image generated by the three-dimensional image processing unit 231 is supplied via the 3D line buffer 232 to the first LCD 211. Also, the output from the capture circuit 233 is supplied to the first VRAM 221a. That is the image supplied in this frame to the first LCD 211 is captured by the capture circuit 233, and is then stored in the first VRAM 221a. Also, the two-dimensional image processing unit 237 reads the image stored in the second VRAM 221b (the image captured in the immediately-preceding even-numbered frame by the capture circuit 233, as will be described further below). This image is, as will be described further below, identical to the image supplied in the immediately-preceding even-numbered frame to the second LCD 212. The image read by the two-dimensional image processing unit 237 is supplied via the 2D line buffer 238 to the second LCD 212. As such, in the odd-numbered frame, the image generated in this frame by the three-dimensional image processing unit 231 is supplied to the first LCD 211, while the image generated in the immediately-preceding even-numbered frame by the three-dimensional image processing unit 231 is supplied to the second LCD 212.

FIG. 1E is an illustration showing the operation of the portable machine 200 in an even-numbered frame. As shown in FIG. 1E, in the even-numbered frame, the image generated by the three-dimensional image processing unit 231 is supplied via the 3D line buffer 232 to the second LCD 212. Also, the output from the capture circuit 233 is supplied to the second VRAM 221b. That is, the image supplied in this frame to the second LCD 212 is captured by the capture circuit 233, and is then stored in the second VRAM 221b. Also, the two-dimensional image processing unit 237 reads the image stored in the first VRAM 221a (the image captured in the immediately-preceding odd-numbered frame by the capture circuit 233, as will be described further below). This image is identical to the image supplied in the immediately-preceding odd-numbered frame to the first LCD 211. The image read by the two-dimensional image processing unit 237 is supplied via the 2D line buffer 238 to the first LCD 211. As such, in the even-numbered frame, the image generated in this frame by the three-dimensional image processing unit 231 is supplied to the second LCD 212, while the image generated in the immediately-preceding odd-numbered frame by the three-dimensional image processing unit 231 is supplied to the first LCD 211.

EXAMPLE PROCESS FOR GENERATING MENUS

Figure 2:
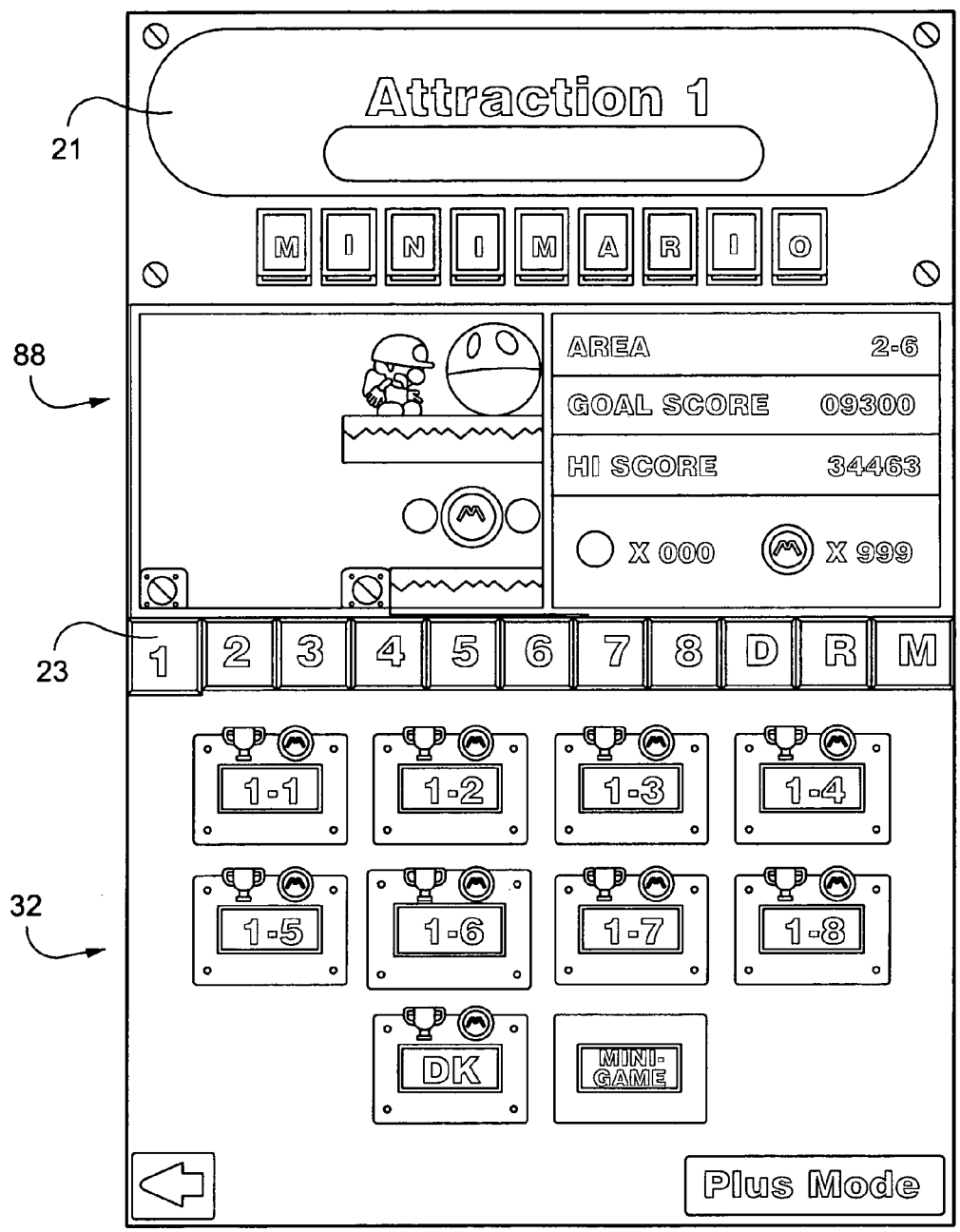
FIG. 2 is an illustration showing a user menu at a portion of a display which corresponds to a particular portion of subject matter loaded into the electronic and communications device of FIG. 1A.
Figure 3:
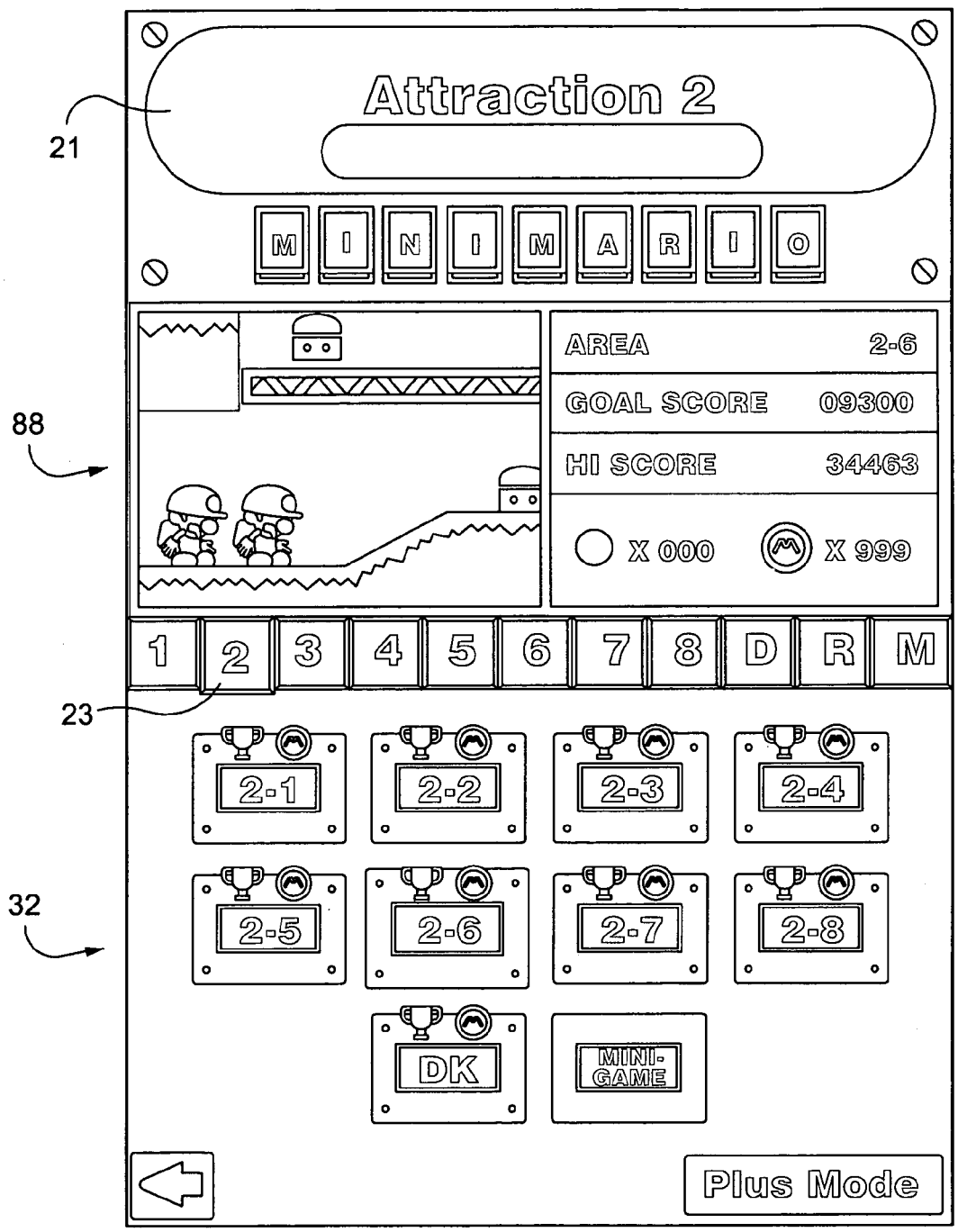
FIG. 3 is an illustration showing a user menu at a portion of a display which corresponds to another particular portion of subject matter loaded into the electronic and communications device of FIG. 1A.
Figure 4:
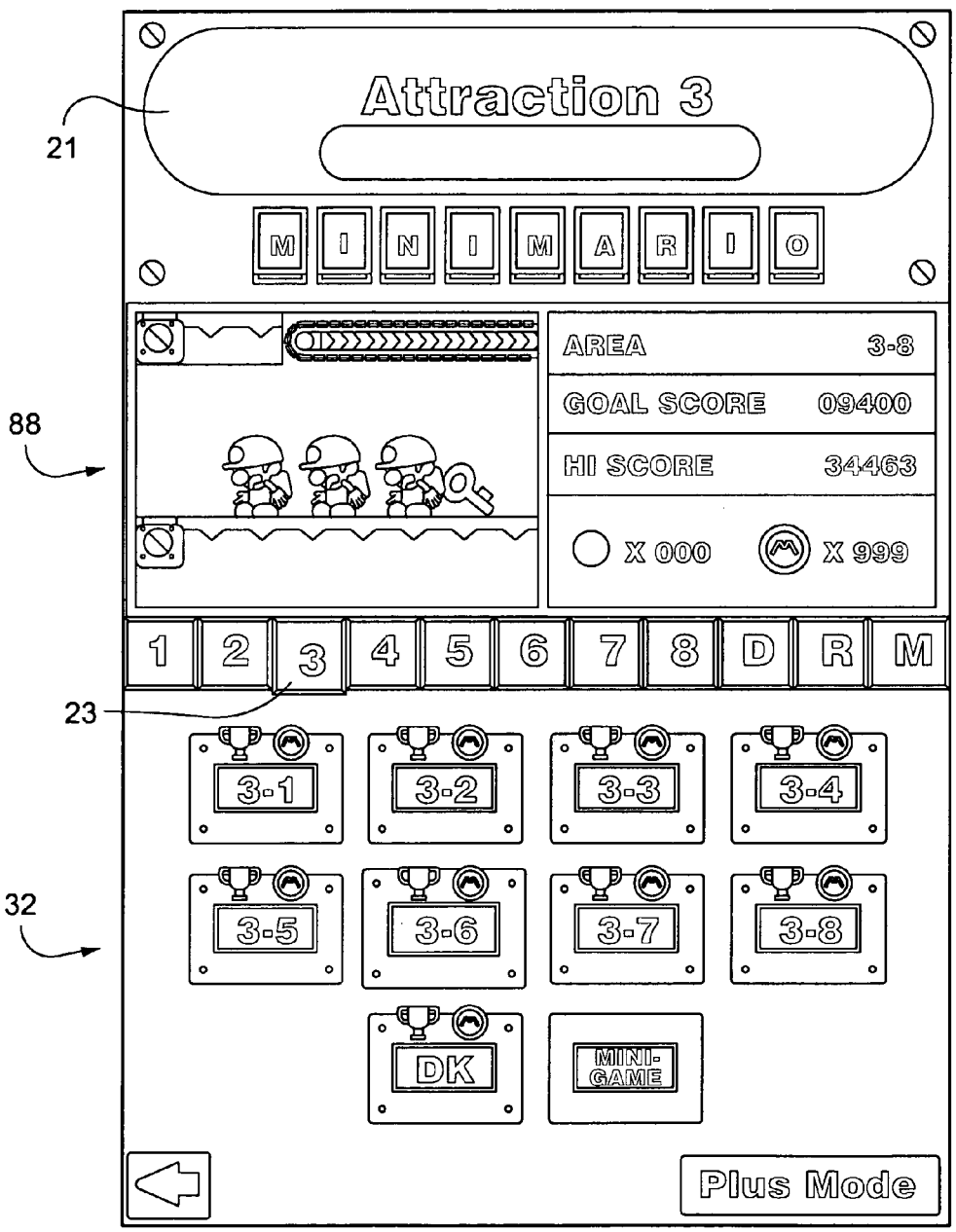
FIG. 4 is an illustration showing a user menu at a portion of a display which corresponds to another particular portion of subject matter loaded into the electronic and communications device of FIG. 1A.
Figure 5:
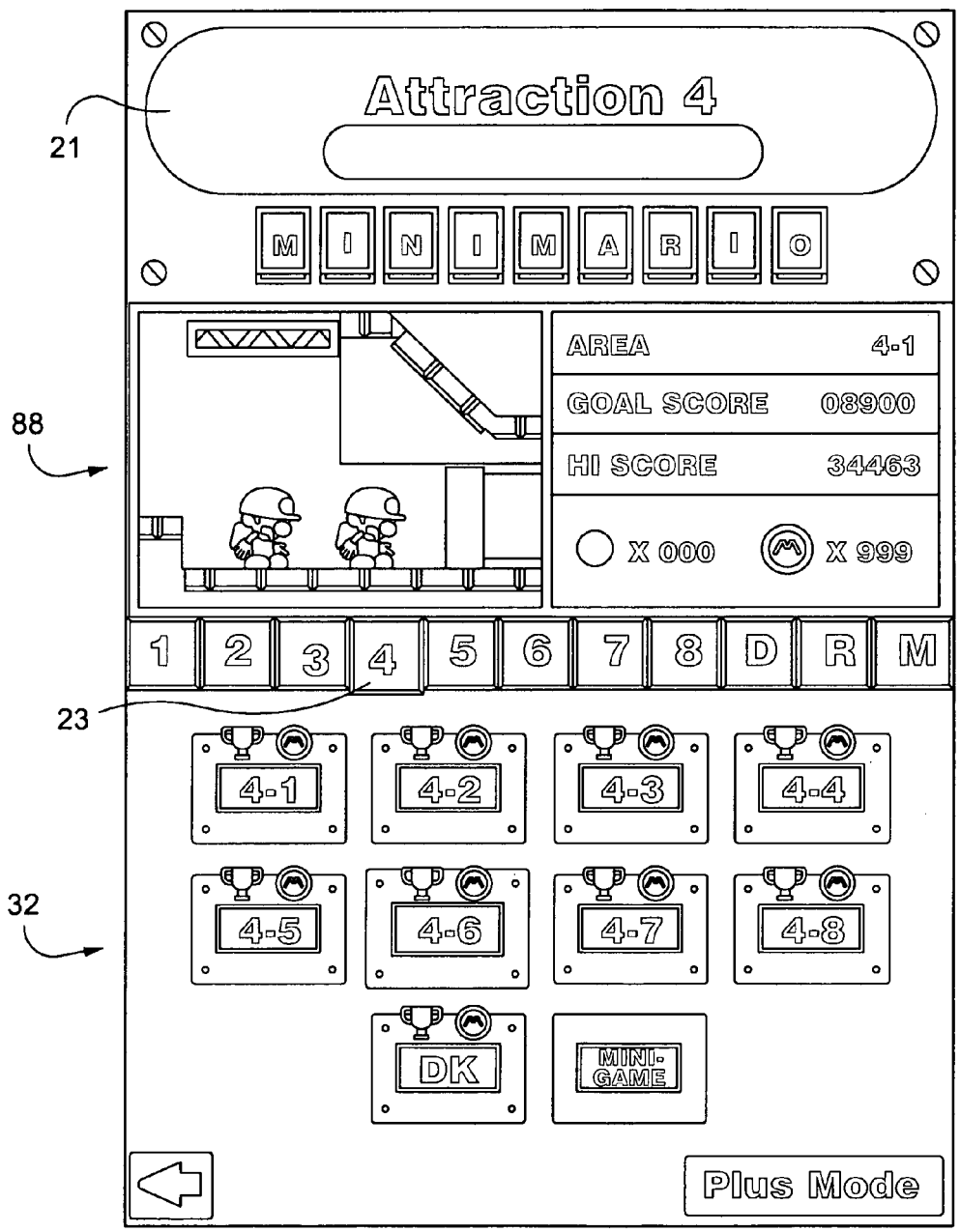
FIG. 5 is an illustration showing a user menu at a portion of a display which corresponds to another particular portion of subject matter loaded into the electronic and communications device of FIG. 1A.
Figure 6:
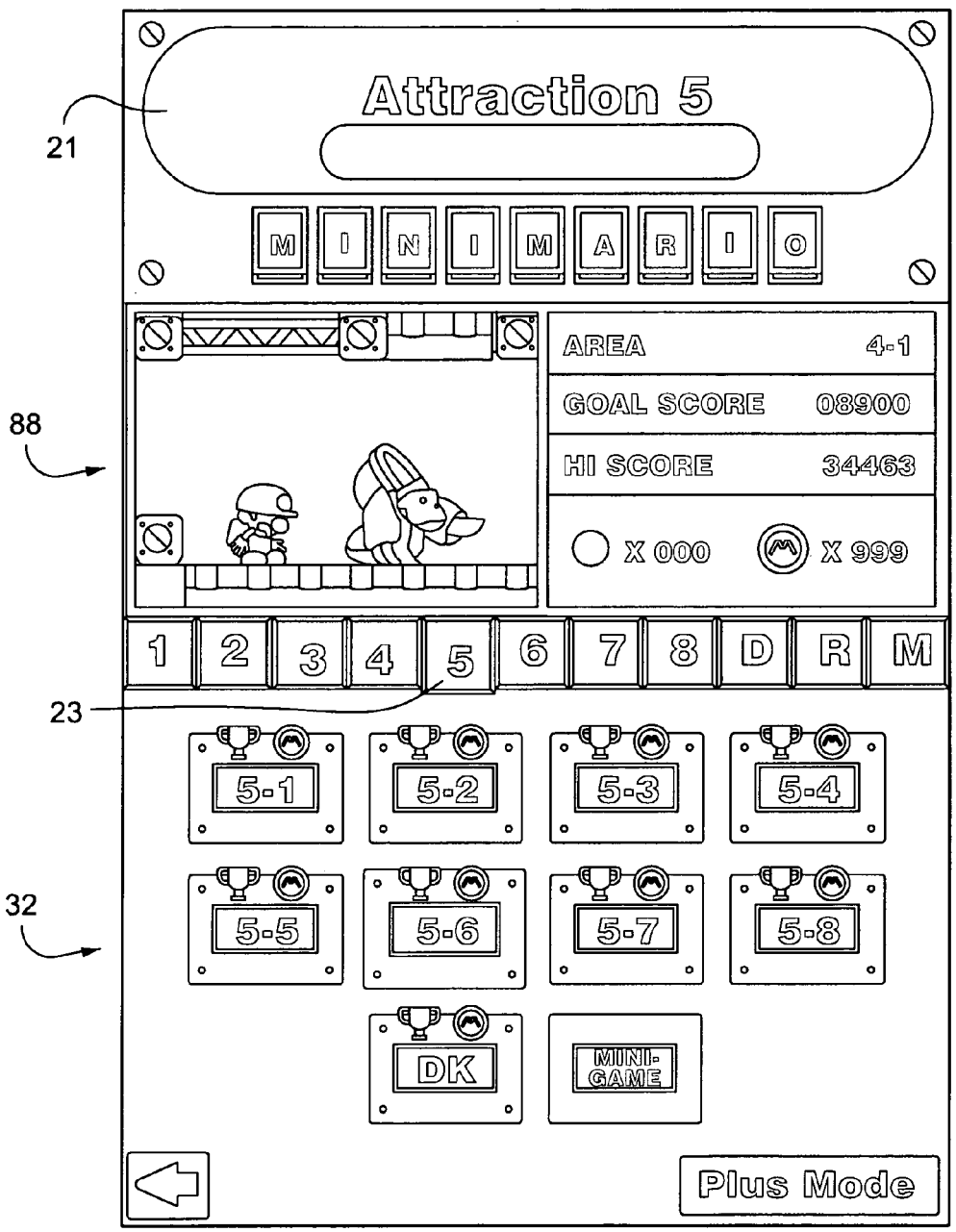
FIG. 6 is an illustration showing a user menu at a portion of a display which corresponds to another particular portion of subject matter loaded into the electronic and communications device of FIG. 1A.
Figure 7:
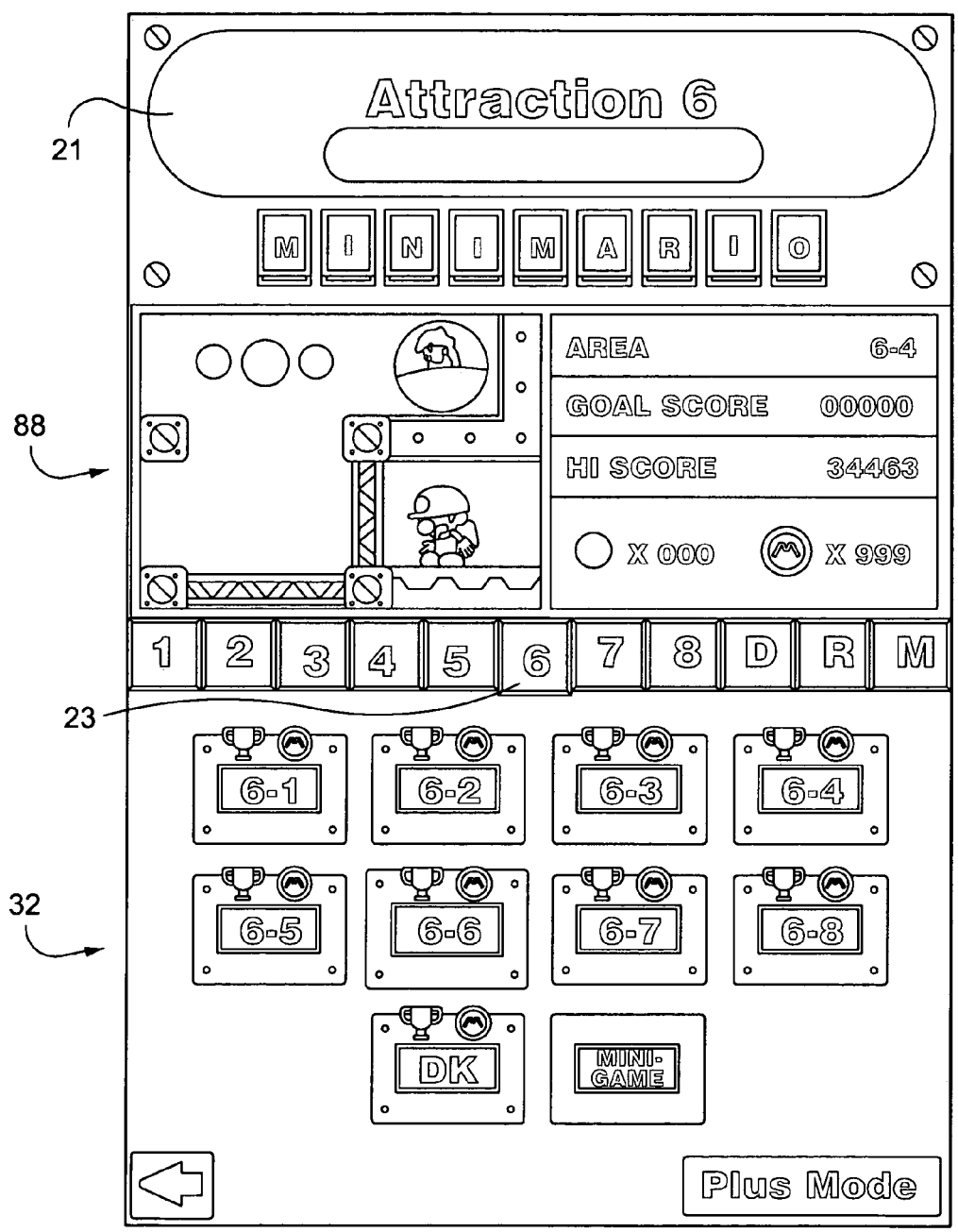
FIG. 7 is an illustration showing a user menu at a portion of a display which corresponds to another particular portion of subject matter loaded into the electronic and communications device of FIG. 1A.
Figure 8:
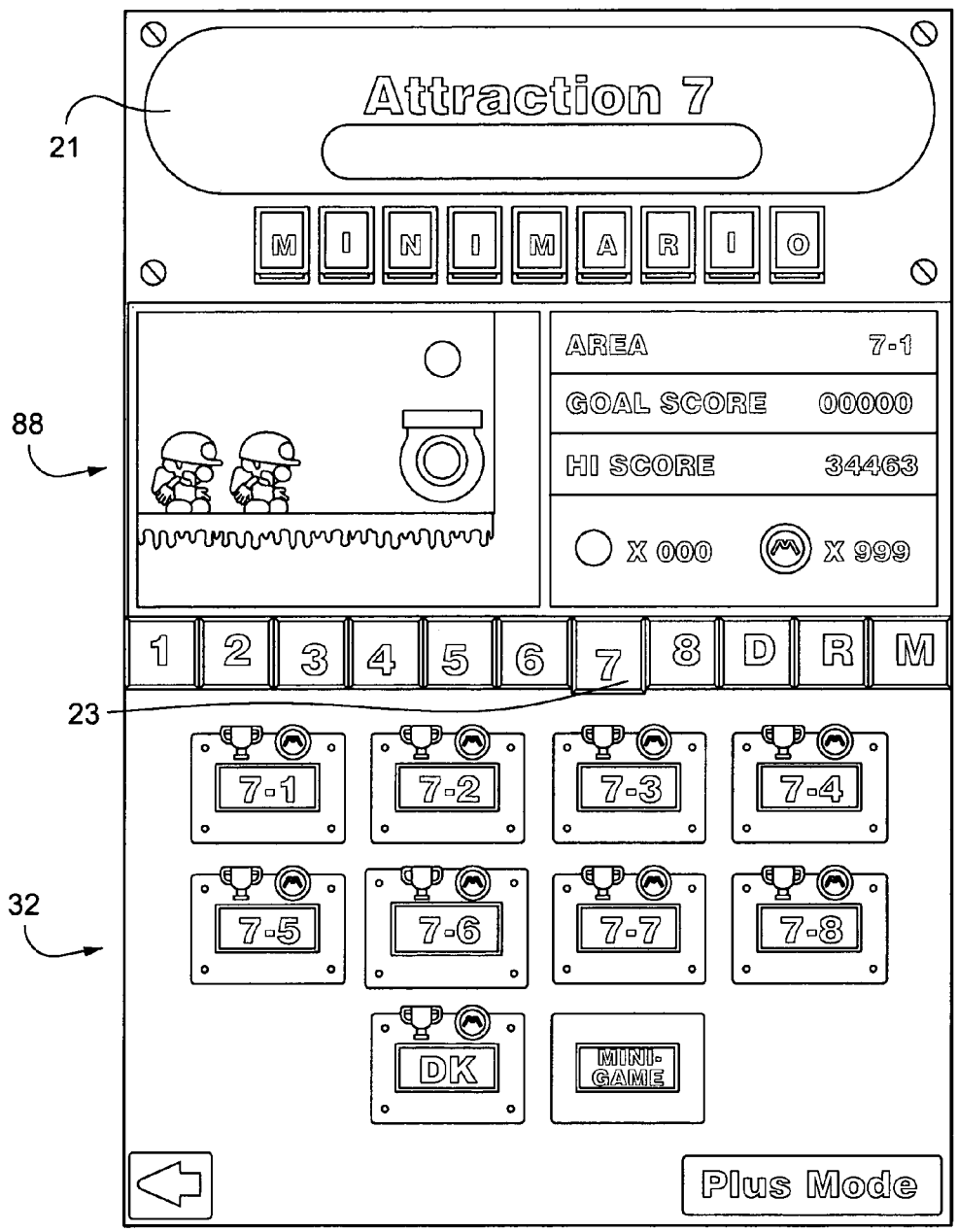
FIG. 8 is an illustration showing a user menu at a portion of a display which corresponds to another particular portion of subject matter loaded into the electronic and communications device of FIG. 1A.
Figure 9:
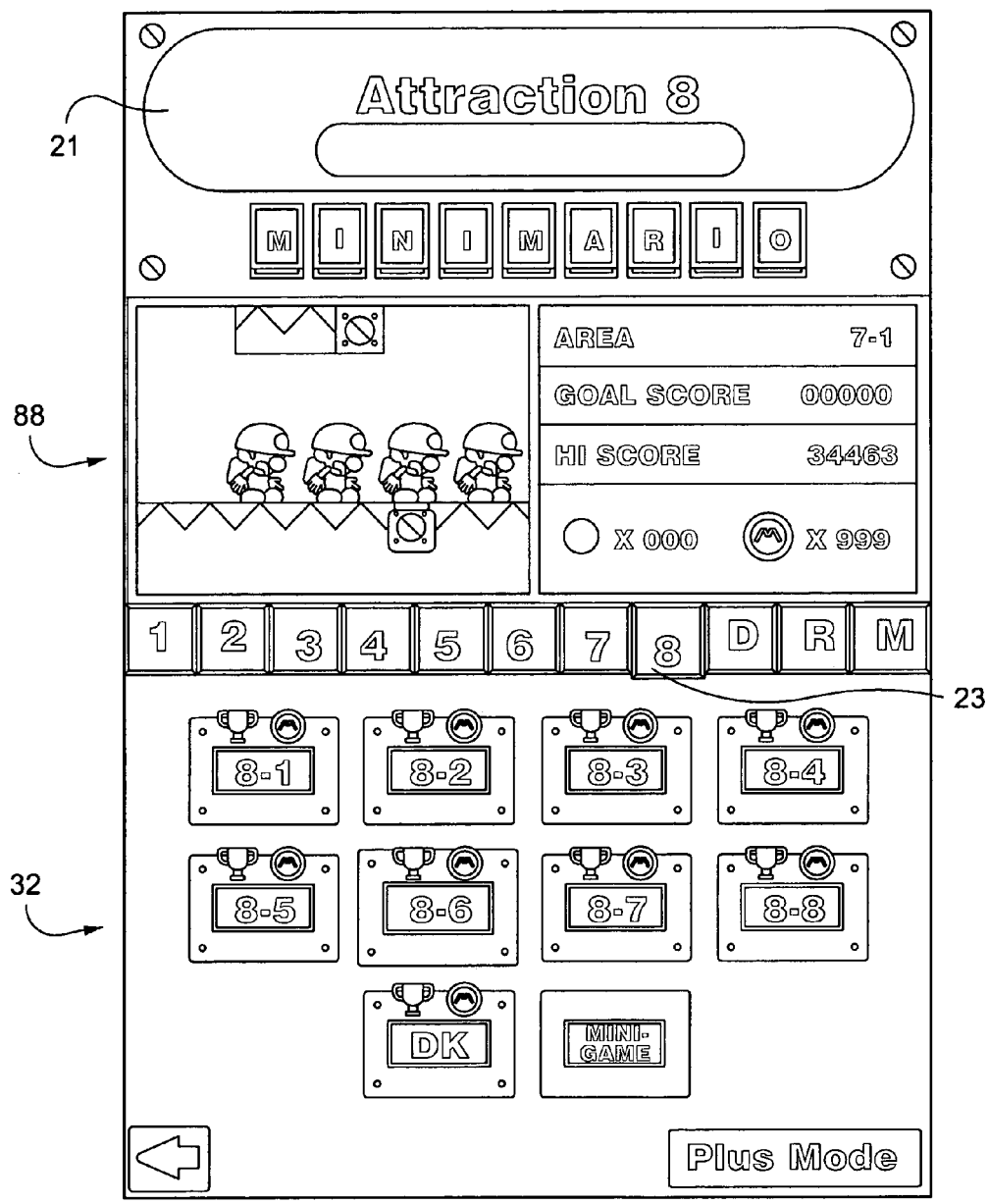
FIG. 9 is an illustration showing a user menu at a portion of a display which corresponds to another particular portion of subject matter loaded into the electronic and communications device of FIG. 1A.

FIGS. 2-9 are illustrations showing Attractions 1-8, D, R, and M where each Attraction has nine areas and one minigame. Beating a Donkey Kong area allows movement to the next Attraction. FIG. 2 depicts that the game is at Attraction 1 as shown by the title block at reference numeral 21 and at the enlarged Attraction 1 box shown by reference numeral 23. An animation frame or frames displayed at a portion of the upper display 88 provides a user menu which depicts subject matter loaded into electronic device 10. Likewise, FIGS. 3-9 depict that the game is at, respectively, Attractions 2-8. Similarly, the animation frames shown at display 88 in FIGS. 2-9 respectively correspond to subject matter contained in Attractions 1-8.

The animation frames shown in the left-hand corner of display 88 gives the user a good idea about what the corresponding Attraction is all about to facilitate selection and navigation through the game menus. In the exemplary illustrative implementation, the images in the left-hand corners of display 88 are user menus dynamically created on the fly by rendering sub-frame portions of the animation for display. In one exemplary illustrative non-limiting implementation, for example, the menuing system accesses an entry point in the corresponding to an Attraction and/or area or other menu selection and internally accesses the animation until a predetermined screen image is created and stored in the frame buffer VRAM 221 without necessarily being displayed. Some or all of this saved image is then accessed from the VRAM 221 for display in the left-hand corner of display 88. Different animation entry points are accessed for different menu selections so the image in the left-hand corner changes depending on the menu selections available. Motion effects can be applied to make the images appear to be taken as still shots from live animation. The capture process is quickly performed to avoid wait time. Images can be retained in RAM until power-down to avoid having to recreate them until next time the device is turned on.

Figure 10:
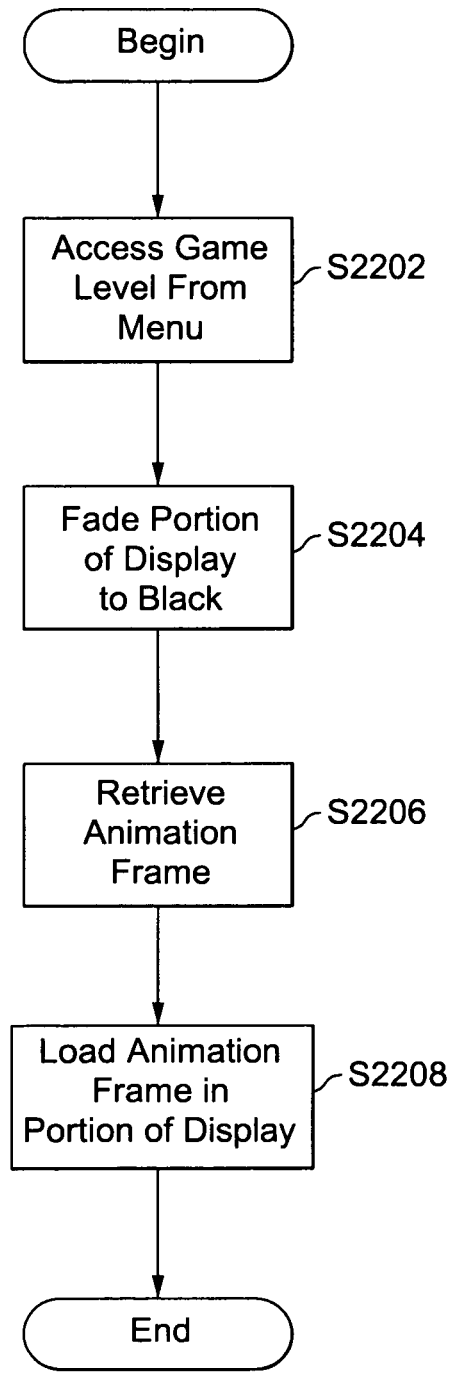
FIG. 10 is a flowchart showing an animation frame selection and display process.

In accordance with the flow chart shown in FIG. 10, CPU 222 is programmed to perform the following steps when a user accesses the menu to select a particular Attraction and/or area of the stored subject matter. In step S2202 the user accesses the menu and selects a particular Attraction level. In step S2204 the CPU causes a portion of display 88 to fade to black—possibly while image capture is proceeding. In step S2206 the CPU accesses, retrieves and renders an animation frame that corresponds to the selected Attraction level. The retrieved animation frame is then displayed in step S2208 at that portion of display 88 that had been faded to black.

Figure 11:
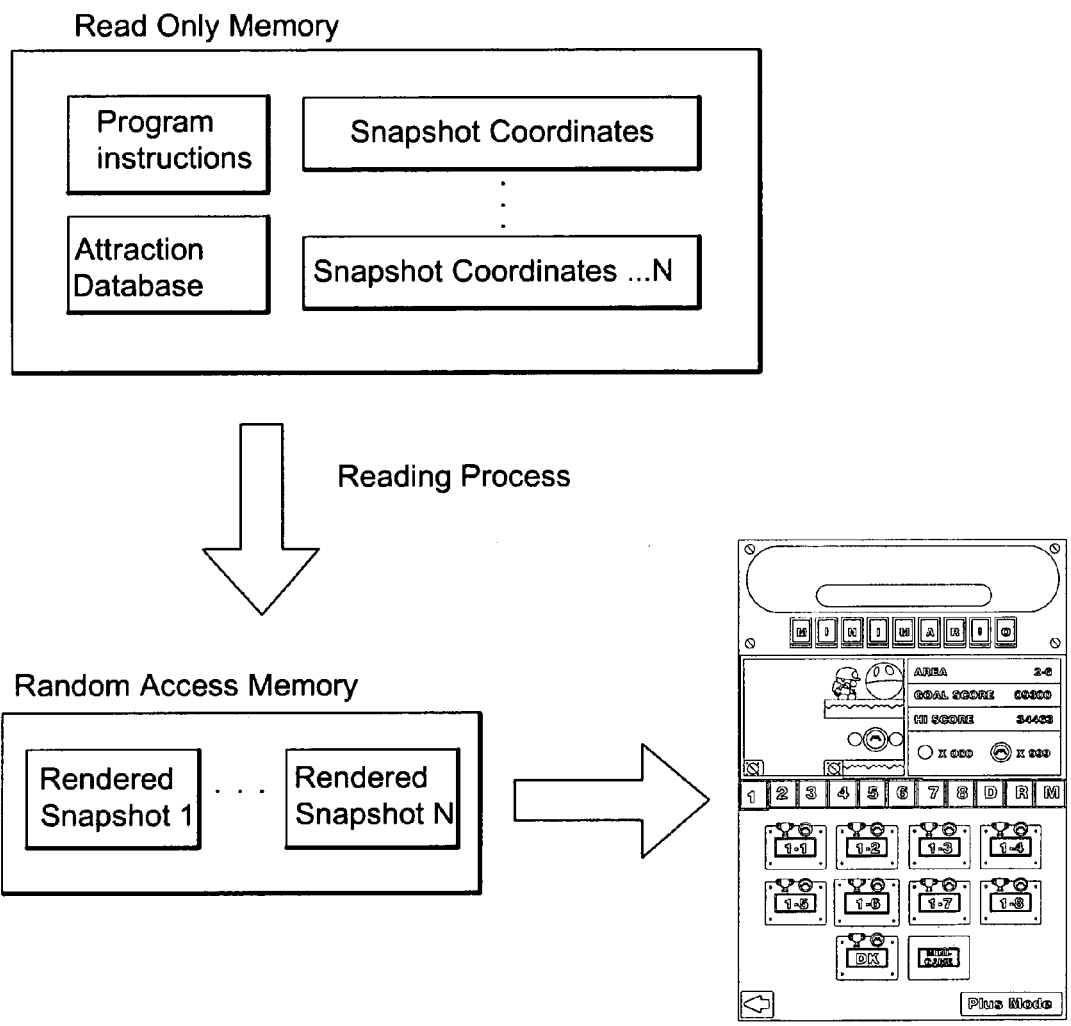
FIG. 11 is a schematic representation of the steps and processes that create, for example, the user menu of FIG. 4.
Figure 12:
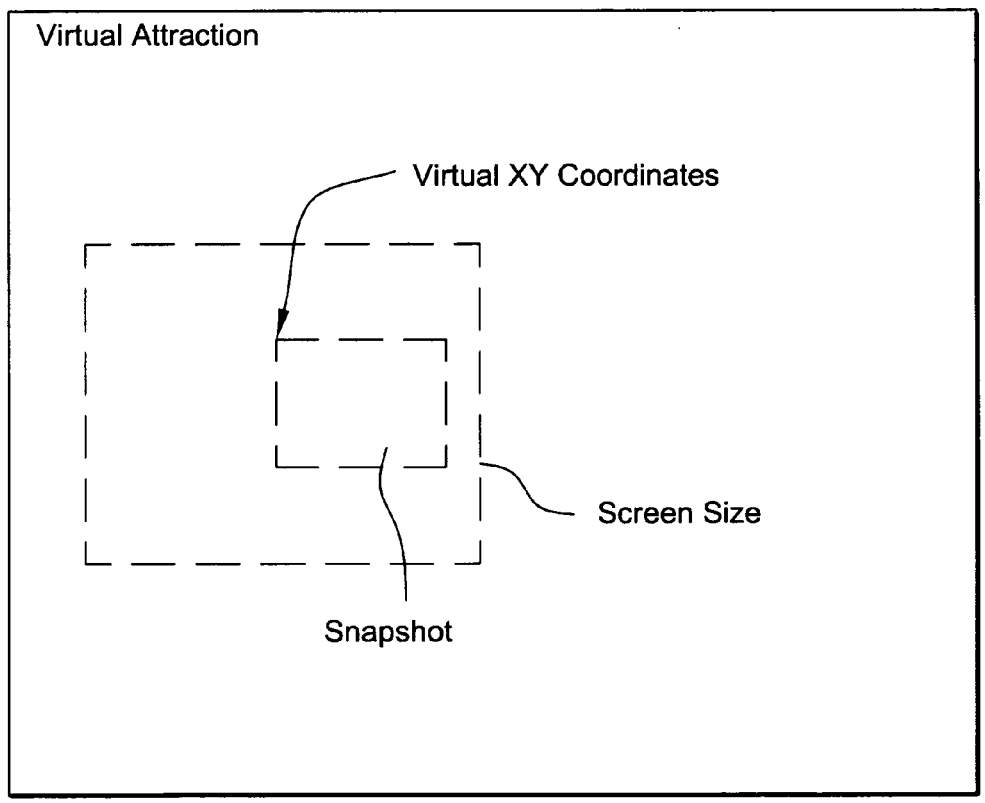
FIG. 12 shows the XY Coordinates that determine the user menu located within a portion of the display.

As shown in FIG. 11, ROM contains program instructions, an Attraction Database, and snapshot coordinates 1 to N. The CPU determines from pre-specified information the snapshot coordinates that correspond to a selected Attraction and generates and outputs one or more rendered snapshots (or animation frames) to RAM. The rendered animation frames are displayed as a user menu which depicts the selected Attraction to provide feedback to the user as to whether or not the desired Attraction has been selected. FIG. 12 depicts that prestored XY coordinates corresponding to animation levels are used to specify which sub-part of an animated display is to be used to generate a display within a portion of the display as a snapshot of the selected Attraction.

Figure 13:
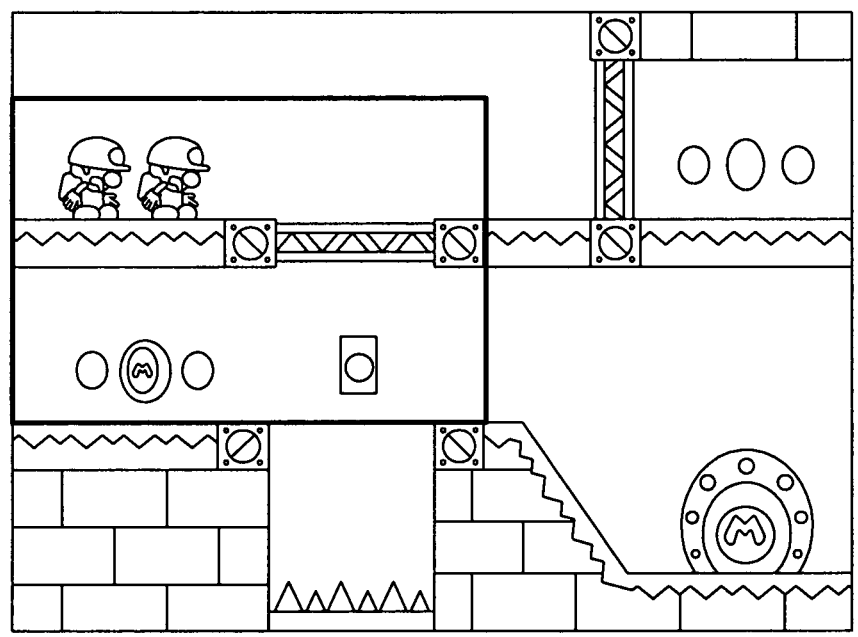
FIG. 13 shows an editor for determining the XY Coordinates for each user menu.

FIG. 13 shows an editor for determining the XY coordinates of each snapshot that comprises a user menu for each Attraction. More particularly, the heavy lined box is positioned within the screen box that displays an Attraction so as to determine the virtual XY coordinates (see FIG. 12) of the upper left hand corner of the snapshot which is to be the user menu for a given Attraction. The snapshot size is fixed so that the user menu for each Attraction will be of equal size. The virtual coordinates XY are stored for each snapshot or user menu corresponding to each Attraction. The XY coordinates are retrieved when a particular Attraction is accessed to create the user menu for that particular Attraction.

As one embodiment, the portable machine having hardware structure as shown in FIGS. 1A to 1E has been described. However, the technology herein is applied not only to the portable machine having such a hardware structure, but to the one having the above hardware structure achieved by the CPU and software. Also, the portable machine according to the present embodiment can be emulated by a computer system, such as a personal computer or a portable information terminal. In this case, a program that causes the computer system to achieve each hardware function of the portable machine according to the present embodiment is supplied to the computer system.

While the technology herein has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. A user interface system for an end-user electronic device that utilizes animation frames from an electronic video game loaded onto the device to dynamically generate end-user menus depicting multiple access levels of the electronic video game selected by a user, said system comprising:
   a capture circuit configured to capture portions of one or more animations for each access level of the electronic video game that has been selected by the user during each run time of the electronic video game;
   a volatile memory for receiving said one or more animation portions from said capture circuit; and
   a display for displaying the processed one or more animation portions received as part of an end-user menu for a particular user-selected access level of the electronic video game at a portion of said display that has been faded to black.

2. The user interface system according to claim 1, further including a three-dimensional image processing unit.

3. The user interface system according to claim 1, further including a two-dimensional image processing unit.

4. The user interface system according to claim 1, wherein said capture circuit comprises a graphic processing unit.

5. The user interface system according to claim 1, wherein a single animation frame is captured and displayed.

6. The user interface system according to claim 1, wherein more than one animation frames are captured and stored for display.

7. A method of dynamically displaying end-user menus on an electronic device using animation frames illustrating multiple access levels selected by a user from an electronic video game stored into the electronic device, said method comprising:
- capturing one or more animation frames from the stored electronic video game in response to the user selecting a particular access level of said multiple access levels of the stored electronic video game during each run time of the electronic video game;
- storing said one or more animation frames in a video random access memory VRAM;
- processing and displaying said one or more animation frames received from said VRAM at a portion of a display that has been faded to black; and
- displaying the processed one or more animation frames as a user menu of the user-selected access level of the stored electronic video game in the display.

8. The method according to claim 7, wherein a single animation frame is captured, processed, and displayed.

9. The method according to claim 7, wherein more than one animation frames are captured, processed, and displayed.

10. A computer implemented method of dynamically displaying end-user menus on an electronic device using animation frames illustrating multiple access point levels selected by a user from a stored electronic video game in said electronic device, said method steps performed by a processor comprising:
- prompting the user to selectively access a particular access level from the multiple access point levels of the stored electronic video game during each run time of the electronic video game;
- fading a portion of a display to black;
- retrieving one or more animation frames that correspond to the user-selected access level; and
- displaying said one or more retrieved animation frames at that portion of the display that has been faded to black as said user menu.

11. The computer implemented method of claim 10, wherein a single animation frame is retrieved and displayed.

12. The computer implemented method of claim 10, wherein more than one animation frames are retrieved and displayed.

* * * * *